United States Patent [19]

Silver

[11] 3,726,956
[45] Apr. 10, 1973

[54] METHOD FOR DISSOLVING MOLYBDENUM AND TUNGSTEN

[76] Inventor: Gary L. Silver, 30 Bradstreet Road, Apt. 6, Centerville, Ohio

[22] Filed: Feb. 23, 1972

[21] Appl. No.: 228,614

[52] U.S. Cl. ...........................423/4, 75/101, 423/61
[51] Int. Cl. ..............................................C01g 56/00
[58] Field of Search ........................423/4, 61; 75/101

[56] References Cited

UNITED STATES PATENTS

| | | | |
|---|---|---|---|
| 2,891,840 | 6/1959 | Curtis | 423/4 |
| 3,343,924 | 9/1967 | Anastasia | 423/4 |

FOREIGN PATENTS OR APPLICATIONS

| | | | |
|---|---|---|---|
| 648,041 | 5/1964 | Belgium | 423/4 |

OTHER PUBLICATIONS

Nuclear Science Abstract, Subject Index, Vol. 22, 1968, p. 1812.

*Primary Examiner*—Carl D. Quarforth
*Assistant Examiner*—R. L. Tate
*Attorney*—Roland A. Anderson

[57] ABSTRACT

Method of dissolving tungsten or molybdenum materials such as molybdenum coatings from fissionable materials such as nuclear fuel ceramic particles by contacting the molybdenum with sodium hypochlorite (NaClO) solution until desired dissolution is generally complete.

4 Claims, 1 Drawing Figure

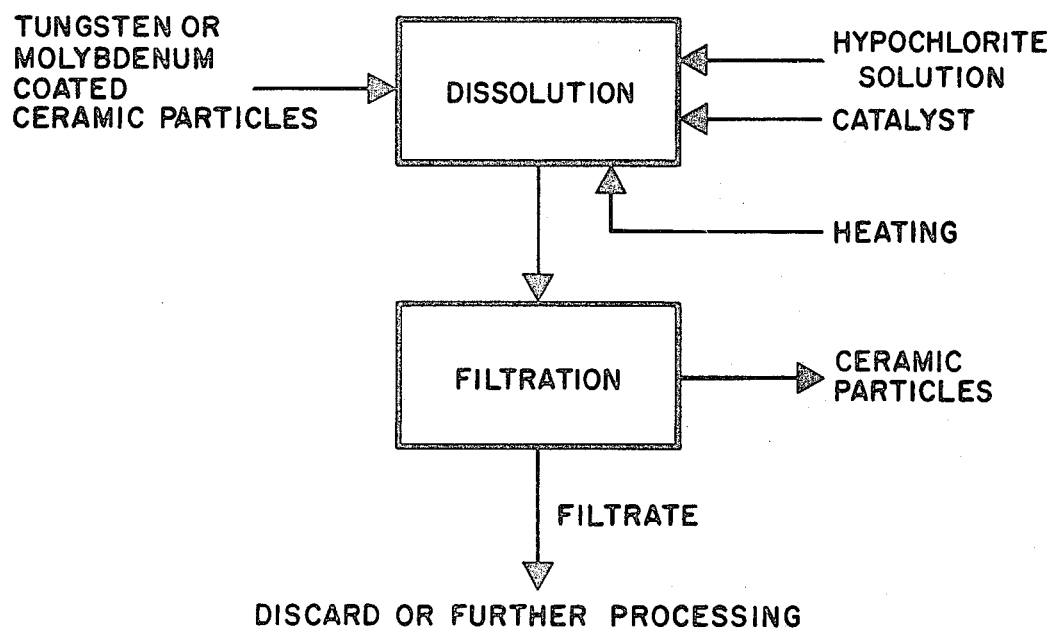

METHOD FOR DISSOLVING MOLYBDENUM AND TUNGSTEN

BACKGROUND OF INVENTION

Nuclear fuel elements, in many cases, are generally removed from nuclear reactor cores prior to complete usage of fissionable material in the fuel elements. Situations which give rise to the need to remove these elements may be cladding material rupture, accumulation of fission products, deleterious physical changes, etc. as we-l as normal replacement requirements. The fuel element may contain, at the time of removal, varying amounts of its original charge of fissionable material depending on length of use and reason for replacement. The high capital investment in this material compels its separation and reuse from such fuel elements and often even from partially completed fuel elements or manufacturing rejects and scraps.

The fissionable fuel of these nuclear fuel elements may often be in a ceramic or oxide form and be alloyed or clad with molybdenum or with molybdenum containing small quantities of alloying metals. Therefore, in order to recover the ceramic fissionable fuel or material for purification and reuse, the need exists for the separation of the molybdenum cladding or coating. While this may be done by dissolution of molybdenum in an acid such as nitric acid, this process has two problems—one is that ceramic fuel particles, such as plutonium oxide, uranium oxide, thorium oxide and the like, also readily, or to a great extent, dissolve in these solutions. The second problem is that molybdenum, under the same conditions, is oxidized to a finely divided insoluble molybdic acid precipitate which may result in extra separation steps as well as the coprecipitation of valuable fissionable materials and useful fission products with the molybdenum precipitate. Efforts to form soluble iron-molybdenum complexes by the addition of an iron complexing agent in this process have the disadvantage of adding an impurity and consequently increasing the volume of liquid requiring treatment and purification. Consequently, additional handling operations that are difficult and expensive are required, all combining to render this process unsatisfactory. A second process for dissolving molybdenum involves fusion of the molybdenum coated particles with potassium nitrate, but this process is hazardous and requires the use of undesirably high temperatures.

SUMMARY OF THE INVENTION

With difficulties and drawbacks such as the foregoing in mind, it is an object of this invention to provide a simple method for dissolving and removing molybdenum and/or tungsten from molybdenum or tungsten containing materials, and more specifically, from coated ceramic particles.

It is an object of this invention to dissolve the molybdenum coating from nuclear fuel elements without adversely affecting the fissionable material, such as ceramic particles of plutonium oxide, thorium oxide, uranium oxide and other radioisotopic materials.

It is a further object of this invention to provide a method for dissolving molybdenum wherein neither fusion processes nor the use of strong acids is required, and wherein the dissolution may be conducted at temperatures from about 50°C to about 100°C.

It is a further object to provide a reaction process which may be accelerated with the use of an appropriate catalyst.

It is a further object to provide a method for the separation and recovery of fissionable materials from molybdenum containing alloys and other mixtures of molybdenum with these materials.

Various other objects and advantages will appear from the following description. It is understood that persons skilled in the art may make various changes within the scope and principles of this invention as brought out in the appended claims.

This invention comprises a method of dissolving tungsten and molybdenum coatings on substrates such as nuclear fuel ceramic particles using an alkali metal hypochlorite aqueous solution as the dissolving agent.

DESCRIPTION OF DRAWING

The drawing illustrates a schematic view of a preferred processing sequence of this invention.

DETAILED DESCRIPTION

As shown in the drawing, the initial molybdenum coated material may be a radioisotopic material commonly used in fuel elements. Examples of such molybdenum coated ceramic nuclear fuel materials or fissionable materials are such as plutonium oxide, uranium oxide, thorium oxide, and mixtures or other oxides thereof in the form of coated particles, microspheres, or otherwise. Although the dissolution of molybdenum is primarily discussed here, the same principles of this invention may be used to dissolve other metals such as tungsten and alloys thereof. The molybdenum coated fissionable material is placed in contact with the solvent solution of sodium hypochlorite (NaClO) in water in any suitable manner, such as immersion, swabbing, spraying, etc., generally referred to hereinafter as submerging, until required dissolution of the molybdenum is generally complete. Although sodium hypochlorite solutions are generally discussed herein, any alkali metal hypochlorite such as lithium, cesium, rubidium, potassium hypochlorite solutions may be successfully used. The alkali metal hypochlorite solvent solution used should be at a concentration of from about 10 percent to about 20 percent available chlorine and preferably should contain about 15 percent available chlorine. The solution may be heated to and maintained at various temperatures during dissolution reactions to increase the dissolution rate dependent upon reaction speed desired, type of materials being used, etc. Typical heating temperatures may be from about 50°C to about 100°C and preferably between about 80°C and the boiling point of the solution (about 100°C). Other factors which may affect the dissolution rate include the amount of molybdenum surface area exposed to the solution, stirring rates, use of catalysts as described below, solution concentrations, and the like. Preferably, the material to be treated is pulverized or comminuted to a size of from about 105 to about 250 microns. This step is not essential if the molybdenum or tungsten metal to be dissolved is readily available to the solution. Good results have been obtained with sodium hypochlorite solutions containing between about 10 percent and about 20 percent available chlorine.

The dissolution of molybdenum by sodium hypochlorite solutions which may have been heated may be accelerated by the use of an appropriate catalyst such as mercuric nitrate or other noble metals oxidizable by NaClO. For example, 5 grams of powdered molybdenum were solubilized in 200 ml of sodium hypochlorite solution having about 15 percent available chlorine, at the solution boiling point in approximately 15 minutes. This time may be considerably decreased by the use of an appropriate catalyst, such as mercuric nitrate at a concentration of from about 0.1 to about 10 milligrams (mg) of mercuric nitrate per milliliter (ml) of sodium hypochlorite solution. In comparison with the above rates, 5 grams of powdered molybdenum were solubilized in 200 ml of sodium hypochlorite solution having about 15 percent available chlorine. The solution temperature was boiling point temperature and the solution contained about 0.2 milligrams of mercuric nitrate catalyst per milliliter of sodium hypochlorite solution. Dissolution occurred in approximately 10 minutes.

At the higher concentrations of mercuric nitrate catalyst, some basic mercuric compounds may precipitate and remain with the ceramic oxide upon filtration. Filtration may thus be followed by a brief exposure of the ceramic particles to dilute (1–2 M) acid containing a halide, such as a chloride, in which the ceramic oxide is not appreciably soluble. This will remove the mercuric oxide, mercuric molybdate, and any other acid soluble metal oxides which may have been derived from an alloying metal in the molybdenum. Alternatively, the mercuric oxide, molybdate, or halide may be removed by volatilization at appropriate temperatures.

Some typical results obtained by application of this process to from 105 to 177 micron molybdenum coated thorium oxide particles are shown in the following table. Each entry corresponds to the treatment of 5 grams of coated oxide with 150 mls of hot (near the solution boiling point of about 100°C) 15% available chlorine sodium hypochlorite solution for from about 10 to about 15 minutes, although this proportion and time are not critical and might be altered by those skilled in the art. Mercuric nitrate catalyst concentrations, where used, were about 0.2 mg/ml. Basic mercuric precipitates were not noted. Once the molybdenum has been dissolved, the fissionable or remaining solid material may be separated by any suitable process, e.g., filtration, decantation, and the like, which separation processes are readily available to one skilled in the art.

| Sample Number | Initial Molybdenum Coat, as % of Total Weight | Catalyst Mercuric Nitrate | % Mo in ThO$_2$ after Treatment | Time (Min) Treatment |
|---|---|---|---|---|
| 1 | 2.8 | No | 0.05 | 15 |
| 2 | 2.8 | Yes | 0.05 | 10 |
| 3 | 15.6 | No | 0.10 | 15 |
| 4 | 15.6 | Yes | 0.10 | 10 |
| 5 | 8.8 | No | 0.08 | 15 |
| 6 | 8.8 | Yes | 0.06 | 10 |

The samples used for compilation of data in the above table had the molybdenum applied to the particles by the decomposition of molybdenum hexafluoride (MoF$_6$) gas. Because of this, coating of the particles was effected within the pores of the particles into which the gaseous MoF$_6$ could penetrate but into which the solvent solution could not. Thus the amount of molybdenum remaining, as indicated in the table, is a function of the amount of molybdenum which is coated within those pores.

This invention may also be used to dissolve other metals, such as tungsten, from substrates which are not adversely affected by the hypochlorite solution and the role of the catalyst may be even more critical. For example, ½ gram of tungsten material was not affected when submerged or contacted with 125 milliliters of 10 percent available chlorine sodium hypochlorite solution which had been heated to the boiling point of the solution - about 100°C. However, the addition of 0.5 mg/ml mercuric nitrate catalyst to the same solution at the same temperature caused the dissolution of the ½ gram of tungsten material in five minutes.

In some instances, it may be desirable to reprocess the particles through the dissolution cycle. This condition occurs if the sodium hypochlorite solution becomes depleted in available chlorine thereby necessitating more than one treatment of the particles. In the dissolution of molybdenum, the reaction is generally complete when the metallic color of molybdenum gives way to the dark color of the oxide indicating that the coating is dissolved from the particles.

The attack of molybdenum and tungsten respectively by hypochlorite solution may be written as follows:

$$Mo + 3ClO^- + 2OH^- = MoO_4^{--} + 3Cl^- + H_2O \qquad 1$$

$$W + 3ClO^- + 2OH^- = WO_4^{--} + 3Cl^- + H_2O \qquad 2$$

As noted above, the available chlorine in the hypochlorite solution may be determinative of whether there is dissolution or not. The available chlorine content, and hence oxidizing power, of hypochlorite solutions may decrease with age through the disproportionation reaction

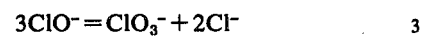
$$3ClO^- = ClO_3^- + 2Cl^- \qquad 3$$

or through decomposition when such solutions are heated, through the reaction

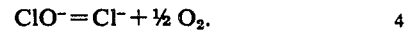
$$ClO^- = Cl^- + \tfrac{1}{2} O_2. \qquad 4$$

Consequently, the percent available chlorine in the hypochlorite solutions should be controlled, rather than the original molarity of the hypochlorite solution.

In summary, it has been discovered that molybdenum (or tungsten) is oxidized and rendered soluble by sodium hypochlorite, NaClO, a common and inexpensive oxidant used in household bleaches. Since sodium hypochlorite is the salt of weak hypochlorous acid, solutions of the salt will be slightly alkaline. The pH of a one molar hypochlorite solution is about 10.5 and more concentrated solutions are more basic. This is desirable for solubilizing hexavalent molybdenum. In acid baths, the hypochlorite ion may yield chlorine

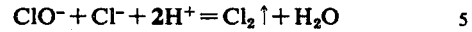
$$ClO^- + Cl^- + 2H^+ = Cl_2 \uparrow + H_2O \qquad 5$$

This reaction establishes the lower pH limit for the attack on molybdenum at about pH 3.

It has been found that molybdenum is solubilized by hot alkali metal hypochlorite solutions within the pH range of about 3 to about 14. Since hypochlorite may also be used in very alkaline solutions (where molybdenum or molybdenum alloys may be more easily oxidized than in slightly alkaline solutions), increasing the pH of the stripping solution to the upper pH range limit by adding sodium or potassium hydroxide may be advantageous. Moreover, most metal oxides suitable for nuclear fuels are not appreciably soluble in solutions which are only slightly acidic, neutral or alkaline, so that any attack of such metal oxide, such as thorium oxide, by the NaClO solution will yield insoluble thorium hydroxide which still allows easy separation from the dissolved molybdenum by an appropriate filtration or other separation process. It can thus be seen that this process may also be used to separate molybdenum and tungsten from any metal oxide or other substrate which is not soluble in the sodium hypochlorite solutions hereinabove described.

What is claimed is:

1. A method for selectively dissolving from fissionable ceramic particles taken from the group consisting of thorium oxide, uranium oxide, plutonium oxide, and mixtures thereof, a coating selected from the group consisting of tungsten and molybdenum, comprising providing an aqueous bath having from about 10 percent to about 20 percent available chlorine and containing from about 0.1 mg/ml to about 10 mg/ml of mercuric nitrate, heating said bath to temperature in the range from about 50°C. to the boiling temperature of the bath, submerging said particles with said coating in said heated bath to achieve dissolution of said coating, and thereafter separating undissolved matter from said bath.

2. The method of claim 1, together with providing said available chlorine by adding an alkali metal hypochlorite.

3. The method of claim 1 wherein said bath is at a temperature from about 80°C to about 100°C.

4. The method of claim 1 wherein said mercuric nitrate concentration is from 0.1 mg/ml to about 3.0 mg/ml.

* * * * *